United States Patent
Merettig et al.

(10) Patent No.: US 9,677,914 B2
(45) Date of Patent: Jun. 13, 2017

(54) OPTOELECTRONIC SENSOR FOR RECOGNIZING OBJECT EDGES

(71) Applicant: SICK AG, Waldkirch/Breisgau (DE)

(72) Inventors: Gerhard Merettig, Sexau (DE); Roland Bergbach, Malterdingen (DE); Matthias Schonstein, Freiburg (DE); Ingolf Horsch, Freiburg (DE); Matthias Gotz, Freiburg (DE); Alexander Bohli, Bad Krotzingen (DE)

(73) Assignee: SICK AG, Waldkirch/Breisgau (DE)

( * ) Notice: Subject to any disclaimer, the term of this patent is extended or adjusted under 35 U.S.C. 154(b) by 246 days.

(21) Appl. No.: 14/270,737

(22) Filed: May 6, 2014

(65) Prior Publication Data

US 2014/0333939 A1 Nov. 13, 2014

(30) Foreign Application Priority Data

May 8, 2013 (EP) ..................................... 13167070

(51) Int. Cl.
  *G01D 5/26* (2006.01)
  *G01B 11/02* (2006.01)
(52) U.S. Cl.
  CPC ............. *G01D 5/26* (2013.01); *G01B 11/028* (2013.01)
(58) Field of Classification Search
  CPC ................................ G01D 5/26; G01B 11/028
  USPC ............. 250/559.36; 356/237, 238, 429, 430
  See application file for complete search history.

(56) References Cited

U.S. PATENT DOCUMENTS

| | | | |
|---|---|---|---|
| 4,112,309 A | 9/1978 | Nakazawa et al. | |
| 4,217,491 A | 8/1980 | Dufford, Jr. et al. | |
| 4,845,374 A | 7/1989 | White et al. | |
| 4,899,041 A | 2/1990 | Fetzer et al. | |
| 5,056,922 A * | 10/1991 | Cielo ................... | G01B 11/245 356/3.06 |
| 5,280,171 A | 1/1994 | Halter | |

(Continued)

FOREIGN PATENT DOCUMENTS

| | | |
|---|---|---|
| DE | 3729334 A1 | 3/1989 |
| DE | 19624186 A1 | 1/1998 |

(Continued)

OTHER PUBLICATIONS

Search Report issued in European Application No. 13167070.5 dated Sep. 23, 2013 (Sep. 23, 2013), three (3) pages.

(Continued)

*Primary Examiner* — Renee Chavez
(74) *Attorney, Agent, or Firm* — Nath, Goldberg & Meyer; Jerald L. Meyer; Christopher Thomas (57) ABSTRACT

An optoelectronic sensor for recognizing object edges of objects comprises at least three light transmitters which are arranged such that at least two different spacings result between two respective light transmitters. For recognizing an object edge, an evaluation unit is configured to carry out a common evaluation of an image taken by a light receiver of a light spot generated by the transmitted light beams of a first light transmitter and of an image taken by a light receiver of a light spot generated by the transmitted light beams of another light transmitter. The pair of light transmitters to be used for the common evaluation can be selected in dependence on a selection criterion from at least two differently spaced apart pairs of light transmitters.

18 Claims, 4 Drawing Sheets

(56) References Cited

U.S. PATENT DOCUMENTS

| | | | | |
|---|---|---|---|---|
| 5,406,095 A | * | 4/1995 | Koyama | H01L 27/153 257/103 |
| 5,614,710 A | | 3/1997 | Mondie et al. | |
| 5,659,184 A | * | 8/1997 | Tokunaga | B41J 2/45 257/103 |
| 5,841,540 A | | 11/1998 | Mondie | |
| 6,175,419 B1 | * | 1/2001 | Haque | G01D 5/342 250/559.12 |
| 6,323,954 B1 | | 11/2001 | Halter | |
| 6,618,155 B2 | * | 9/2003 | Metcalfe | G01B 11/245 250/559.25 |
| 6,621,092 B1 | | 9/2003 | Furuta et al. | |
| 7,075,099 B2 | * | 7/2006 | Buisker | B65H 23/0216 250/239 |
| 7,684,053 B2 | | 3/2010 | Chow | |

FOREIGN PATENT DOCUMENTS

| | | |
|---|---|---|
| DE | 19808215 A1 | 9/1999 |
| DE | 19852173 A1 | 5/2000 |
| DE | 19960653 A1 | 6/2000 |
| DE | 10246449 A1 | 6/2004 |
| DE | 102005062320 A1 | 6/2007 |
| DE | 202008017457 U1 | 10/2009 |
| DE | 102009012997 A1 | 9/2010 |
| DE | 102010022273 A1 | 12/2011 |
| EP | 1041393 B1 | 3/2000 |
| EP | 1039261 A2 | 9/2000 |
| EP | 2 348 331 B1 | 7/2001 |
| EP | 1630519 A | 3/2006 |
| EP | 1801618 A2 | 12/2006 |
| EP | 2530426 A1 | 12/2012 |
| JP | 58223004 A | 12/1983 |

OTHER PUBLICATIONS

Datasheet SUNX "MQ-W Series Triple Beam Trigonometric Area Reflective Photoelectric Sensors", pp. 180-185.

* cited by examiner

OPTOELECTRONIC SENSOR FOR RECOGNIZING OBJECT EDGES

The present invention relates to an optoelectronic sensor for recognizing object edges of objects.

Optoelectronic sensors are frequently used to recognize objects transported in a conveying direction such as beverage cartons with reference to object edges so that a following further processing such as an application of a straw can take place in a correct manner. As a rule, the conveyed objects are, however, not isolated, but rather follow one another so closely that the transition from one object to the next object can only be recognized with difficulty when the objects move past the sensor.

In order to recognize the narrow gap between two objects with objects following one another closely, an illumination of the objects can take place by two separate light transmitters, a detection can take place by two separate light receivers and a subsequent difference formation of the individual signals can take place, which is also called an energetic balance process. Alternatively, an individual spatially resolving light receiver can be used to determine the spacing of the sensor from the front surfaces of the objects, for example by means of triangulation. On a use of two light transmitters spaced apart from one another, the sensor can recognize a transition between two objects following one another with reference to a spacing difference. This can be called a spacing difference process. Optoelectronic sensors which use such energetic balance processes and/or spacing difference processes for recognizing object edges are set forth in the laying-open specification DE 10 2010 022 273 A1.

The reliability of sensors which use an energetic balance process is, however, relatively greatly dependent on the radius of curvature of the object edges. The spacing difference process in contrast fails when the object front surfaces are aligned exactly the same. Edge recognition by means of optoelectronic sensors is therefore only possible with an increased effort, in particular in such applications in which very rounded objects are conveyed conducted along a longitudinal guide.

It is the object of the invention to provide an edge-recognizing optoelectronic sensor which has more flexible possibilities of use.

The object is satisfied by an optoelectronic sensor having the features of claim 1.

In accordance with the invention, an optoelectronic sensor comprises at least three light transmitters for generating respective collimated or focused transmitted light beams, with the light transmitters being arranged such that at least two different spacings result between two respective light transmitters of the at least three light transmitters; at least one light receiver for taking light spots generated on an object by the transmitted light beams; and an evaluation unit. For recognizing an object edge, the evaluation unit is configured to carry out a common evaluation of an image taken by a light receiver of a light spot generated by the transmitted light beams of a first light transmitter of the at least three light transmitters and of an image taken by a light receiver of a light spot generated by the transmitted light beams of another light transmitter of the at least three light transmitters, wherein the pair of light transmitters to be used for the common evaluation can be selected in dependence on a selection criterion from at least two differently spaced apart pairs of light transmitters. In this respect, in particular a common evaluation of respective images taken by one and the same light receiver of the light spots generated by the transmitted light beams of the two light transmitters can take place by the evaluation unit.

Alternatively, the images of the two light transmitters on optionally present different light receivers can be used for the evaluation.

The common evaluation can in particular be carried out using an energetic balance process or a spacing difference process or a combination of these processes such as are described in DE 10 2010 022 273 A1.

The light transmitters can be light sources which are completely separate from one another or a single light source which generates a plurality of transmitted beams spaced apart from one another by means of an attachment optics such as a diaphragm arrangement. The light receiver or receivers can be spatially resolving in order thus to allow a spacing measurement by means of triangulation. Alternatively, two light receivers can also be arranged on two mutually oppositely disposed sides of the light transmitters to allow an edge detection by means of the above-named energetic balance process. A combination of at least one spatially resolving light receiver and at least two energy-detecting light receivers could also be provided.

Since at least two different spacings between separate light transmitters can be selected, the optoelectronic sensor can be adapted to the requirements of a specific application. The selection per se can in this respect take place by means of a permanent configuration of the optoelectronic sensor carried out before the first use, for example by means of jumpers or of a DIP switch. It is thus possible, for example, to select the larger of the two different spacings if it can be foreseen that the object edges to be recognized have a relatively large radius of curvature. Conversely, the smaller of the two different spacings can be selected if the object edges to be recognized have a comparatively small radius of curvature. It is also favorable on the use of the spacing difference process to select a spacing between the light transmitters of the pair of light transmitters which is as large as possible in the event of highly rounded edges since then the gap between the straight front surfaces of two objects following one another is comparatively large. As a result, the invention thus allows a reliable operation of an edge-detecting optoelectronic sensor in different application situations.

Further developments of the invention are set forth in the dependent claims, in the description and in the enclosed drawing.

For recognizing an object edge, the sensor can be configured to carry out respective common evaluations simultaneously or consecutively for at least two differently spaced apart pairs of light transmitters. For example, all light transmitters can be controlled alternating in time for this purpose. No manual preset, for example by means of DIP switches, is then necessary to adapt the sensor. The adaptation can rather take place dynamically, e.g. in an electronic manner within the evaluation unit.

In accordance with a specific embodiment, the sensor is configured only to use one of the carried out common evaluations in dependence on the selection criterion for recognizing an object edge. The common evaluation most favorable for the respective application can thus be used for the final recognition of the object edge.

The sensor can, however, also be configured to use each of the carried out common evaluations for recognizing an object edge. This means the results of all carried out common evaluations are used.

The sensor can in particular be configured to carry out the recognition of an object edge with reference to a logical link of the two common evaluations carried out for the two differently spaced apart pairs of light transmitters. A particularly robust object recognition can hereby be achieved. The kind of logical link can be adapted to the planned purpose of use as required.

The selection criterion can comprise an expected radius of curvature of an object edge and/or a quality signal generated with reference to the reception intensities of the images of the light spots taken by the light receivers. The expected radius of curvature of the object edges is mostly known for a predefined application. It is favorable to adapt the spacing of the light transmitters to this expected radius of curvature, in particular such that the spacing and the radius of curvature lie in the same order of magnitude. It is, for example, possible when using a quality signal to use that detection signal for the edge recognition which has the highest signal strength. In principle, the selection criterion can also comprise a complex link of a plurality of values such as the expected radius of curvature and the signal strength.

A further embodiment of the invention provides that at least four, and preferably exactly four, light transmitters spaced apart from one another are provided, with the evaluation unit being able to carry out a respective common evaluation for at least two differently spaced apart pairs of light transmitters. A larger number of light transmitters allows more selection possibilities at different spacings for individual pairs of light transmitters and thus for a more finely graduated adaptation of the sensor to different usage relationships. It is, however, preferred for cost reasons not to provide an excessively large number of light transmitters.

Provision can be made that the light transmitters are arranged on a line, preferably a straight line, with the line in particular extending transversely to an expected object edge. It is possible in this manner to scan the curvature extent of the object edge in an ideal manner.

The light transmitters are preferably arranged at a uniform interval on the line. A balanced graduation is thus possible for the spacing between the light transmitters of the pair of light transmitters to be used for the common evaluation.

A further embodiment of the invention provides that a separate transmission optics, in particular a transmission lens, is associated with each of the at least three light transmitters. This allows a particularly large flexibility with respect to the arrangement of the individual light transmitters.

Alternatively, a common transmission optics, in particular a transmission lens, can be associated with the at least three light transmitters. This embodiment is characterized by a particularly small manufacturing effort. The transmission optics can be arranged telecentrically.

The production costs can be lowered in that the at least three light transmitters are formed by respective semiconductor light sources which are arranged on a common semiconductor crystal or on a common chip. A particularly high precision with respect to the position of the light spots generated by the individual light transmitters can moreover hereby be achieved. Such a semiconductor chip can in particular be designed as a saw variant of a standard type LED chip.

The light receivers can be spatially resolving and the evaluation unit can be configured to offset the two spacings determined by means of triangulation from the positions of the two images of the respective light spot taken by the two light receivers with respect to one another and to evaluate the result of the respective offset. Alternatively or additionally, the above-mentioned energetic balance processes can be used.

A further embodiment of the invention provides that the sensor is configured to control the at least three light transmitters alternately. A reliable separation of the individual detection channels is hereby possible.

The object is also satisfied by a method for recognizing object edges of objects having the features of claim 19.

In a method in accordance with the invention, at least two light spots are generated on an object simultaneously or consecutively. The images of the generated light spots are taken by means of at least one light receiver and an image take by a light receiver of a first light spot of the at least two light spots as well as an image taken by a light receiver of another light spot of the at least two light spots are evaluated together, with the light spots being generated by a pair of light transmitters of an arrangement of at least three light transmitters which are arranged such that at least two different spacings results between two respective light transmitters of the at least three light transmitters. The pair of light transmitters is selected in dependence on a selection criterion from at least two differently spaced apart pairs of light transmitters.

The common evaluation can in particular be carried out using an energetic balance process or a spacing difference process or a combination of these processes such as are described in DE 10 2010 022 273 A1.

The invention is in particular based on the recognition that an adaptation of an edge recognition to different radii of curvature can be carried out by selection of a light transmitter spacing from at least two available different light transmitter spacings using simple means.

Provision can be made that a respective common evaluation is carried out for at least two differently spaced apart pairs of light spots and, in dependence on a selection criterion, only one of the common evaluations carried out for the at least two differently spaced apart pairs of light spots or a link of the common evaluations carried out for the at least two differently spaced apart pairs of light spots is used for a recognition of an object edge so that at least two different spacings result between two respective light spots on the object.

An expected radius of curvature of an object edge and/or a quality signal generated with reference to the reception intensities of the images of the light spots taken by the light receivers can be used as the selection criterion.

The recognition of an object edge can be based in a method in accordance with the invention on an energetic balance process and/or on a spacing difference process such as described above. Furthermore, in a method in accordance with the invention, a logical link of two results of common evaluations can be carried out.

The selection of the pair of light transmitters preferably takes place in dependence on a radius of curvature of an expected object edge.

The invention will be described in the following by way of example with reference to the drawings.

Figure 1:
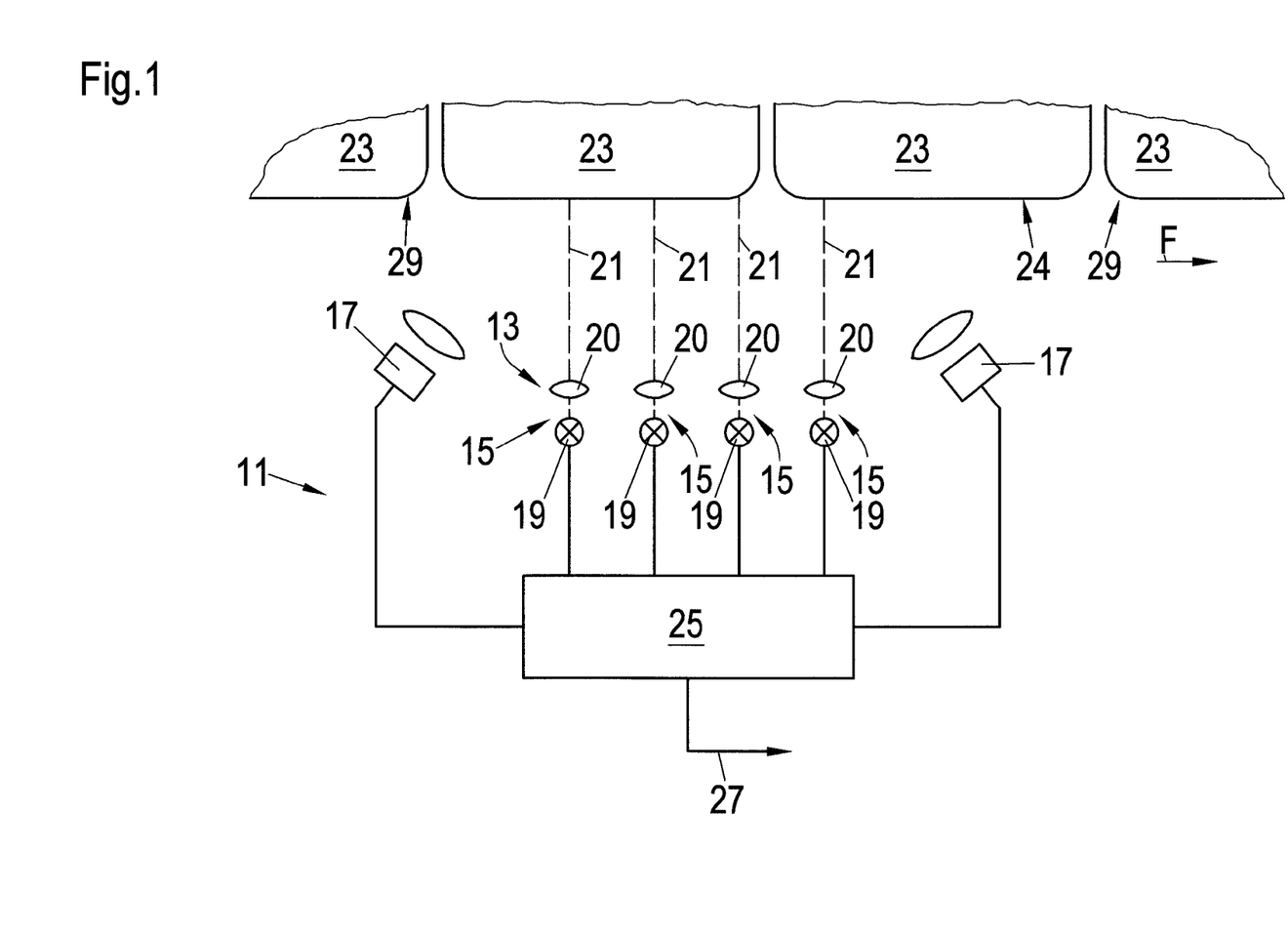
FIG. 1 shows an optoelectronic sensor in accordance with the invention for recognizing object edges of objects in a simplified form.
Figure 2:
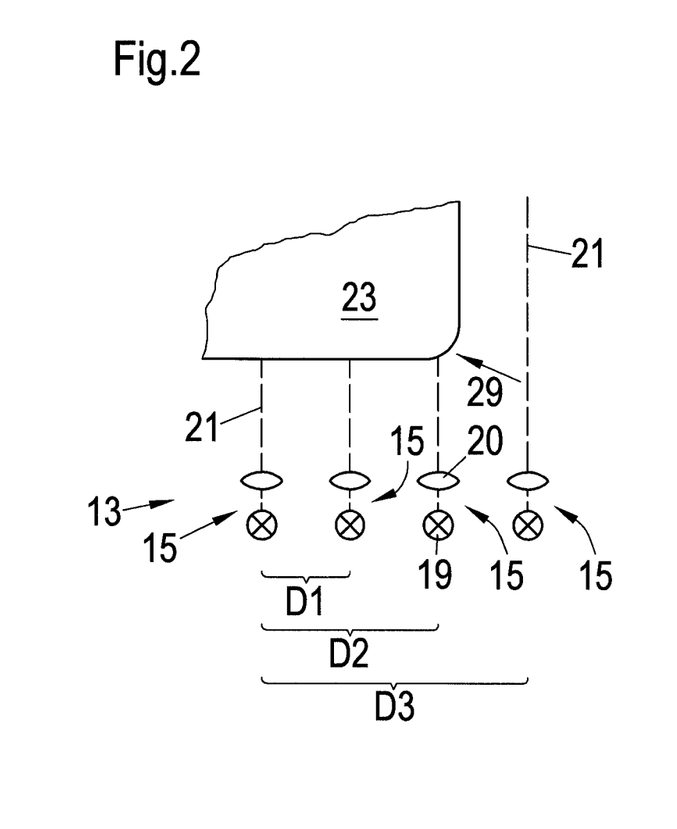
FIG. 2 shows a part of the sensor in accordance with FIG. 1 together with an object to be recognized which has a highly curved object edge.
Figure 3:
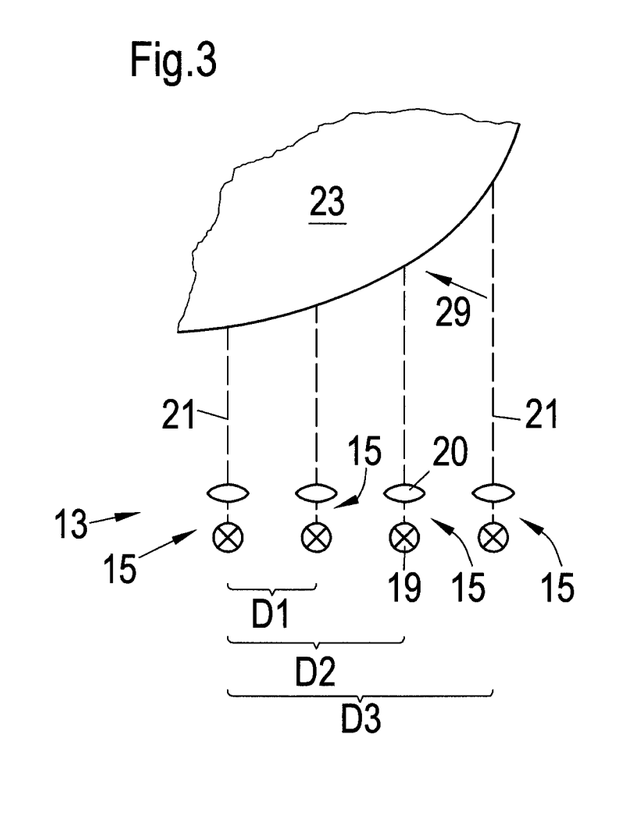
FIG. 3 shows a part of the sensor in accordance with FIG. 1 together with an object to be recognized which has a slightly curved object edge.

The optoelectronic sensor 11 shown in FIGS. 1-3 comprises a light transmission device 13 having four light transmitters 15 and two light receivers 17 arranged in a receiver plane at least substantially symmetrically at both sides, that is to the left and to the right of the light transmission device 13. Each of the four light transmitters 15 comprises a light source 19 and a transmission lens 20. Consequently each of the light transmitters 15 is configured to transmit a collimated or focused transmitted light beam 21. The transmitted light beams 21 are incident, as shown, onto objects 23 which are moved past the sensor 11 in a conveying direction F and generate respective light spots. The transmitted light beams 21 are in this respect at least substantially perpendicular to the end faces 24 of the objects 23 facing the sensor 11, the objects being able to be beverage cartons, for example.

An electronic evaluation unit 25 of the sensor 11 is configured to control four light transmitters 15 independently of one another. The evaluation unit 25 furthermore receives received signals from the two light receivers 17. For recognizing an object edge 29 of an object 23, the evaluation unit 25 carries out a common evaluation of respective images taken by the two light receivers 17 of a light spot generated by the transmitted light beams 21 of one of the light transmitters 15 and respective images taken by the two light receivers 17 of a light spot generated by the transmitted light beams 21 of another light transmitter 15. Based on this common evaluation, the evaluation unit 25 outputs an object detection signal 27 which indicates whether an object edge 29 is currently being moved past the sensor 11. The common evaluation can be carried out with reference to the difference of the intensity signals of the two light receivers 17 and can in particular comprise an energetic balance process such as is set forth in DE 10 2010 022 273 A1. Alternatively or additionally, at least one spatially resolving light receiver (not shown) can be provided which allows a determination of the spacing between the sensor 11 and the end faces 24 of the objects 23 by means of the triangulation process. The presence of an object edge 29 can in this case be detected by a spacing difference provided that two objects 23 following one another are offset from one another viewed in the direction of the sensor 11.

The effectiveness of the edge recognition is dependent in a high degree on the radius of curvature of the object edge 29 both on carrying out an energetic balance method and on carrying out a spacing difference method. The named methods are specifically substantially suitable for such object edges 29 in which the radius of curvature and the spacing between the two light transmitters 15 used for the common evaluation are in the same order of magnitude. The sensor 11 is therefore configured such that the pair of light transmitters 15 to be used for the common evaluation can be selected in dependence on the radius of curvature from all possible pairs of light transmitters 15. In the configuration shown in FIGS. 1-3, in accordance with which four equally spaced apart light transmitters 15 are arranged in a straight line along a line extending transversely to the object edge 29, three different spacings of light transmitters 15 are possible, namely D1, D2=2×D1 and D3=3×D1, as is illustrated in FIGS. 2 and 3.

During the operation of the sensor 11, the evaluation unit 25 controls all the light transmitters 15 alternatingly in time. Respective common evaluations for all possible differently spaced apart pairs of light transmitters 15 are then carried out simultaneously or consecutively. For recognizing an object edge 29, that common evaluation can then be used for which the spacing between the light transmitters 15 is best adapted to the radius of curvature of the object edge 29. For recognizing an object edge 29, the evaluation unit 25 can also carry out a logical link of all common evaluations carried out for the differently spaced apart pairs of light transmitters 15. Alternatively or additionally to the radius of curvature, a quality signal can be used for selecting that pair of light transmitters 15 which quality signal is generated with reference to the reception intensities of the images of the light spots taken by the two light receivers 17.

Figure 4:
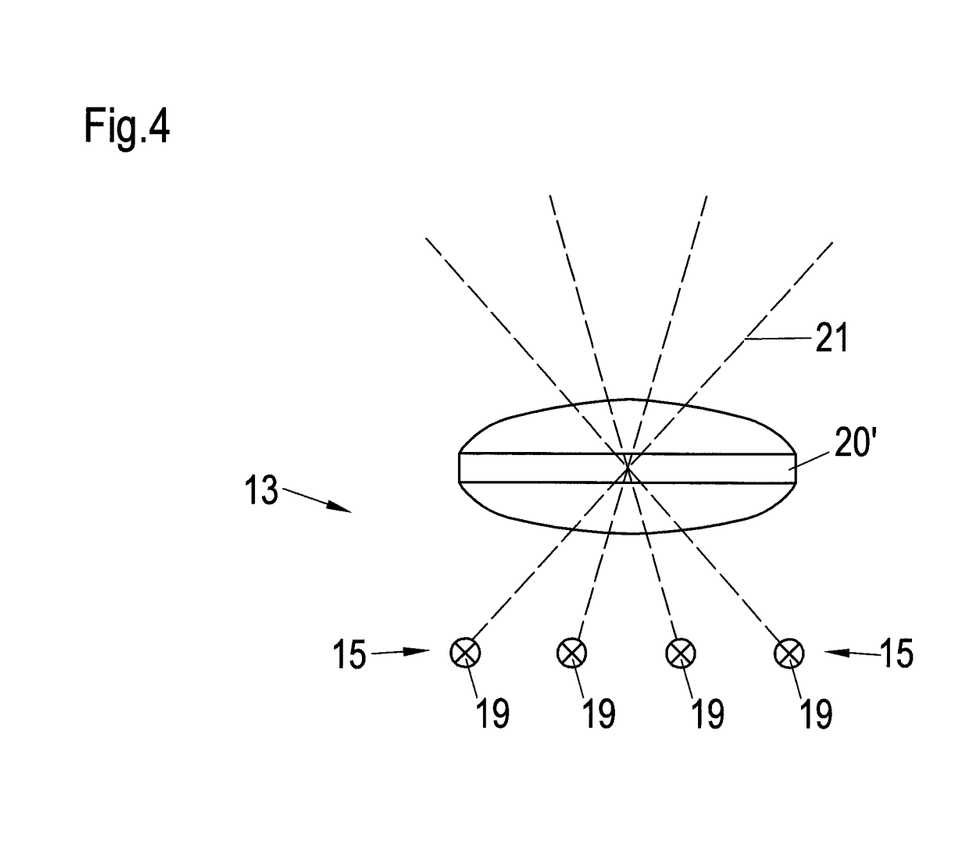
FIG. 4 shows an arrangement of four light transmitters of an optoelectronic sensor in accordance with the invention with which a common transmission lens is arranged.

In the embodiment of a sensor 11 in accordance with the invention shown in FIGS. 1-3, a separate transmission lens 20 is associated with each of the four light transmitters 15. In contrast, FIG. 4 shows an arrangement of four light transmitters 15 with which a common transmission lens 20' is associated.

Figure 5:
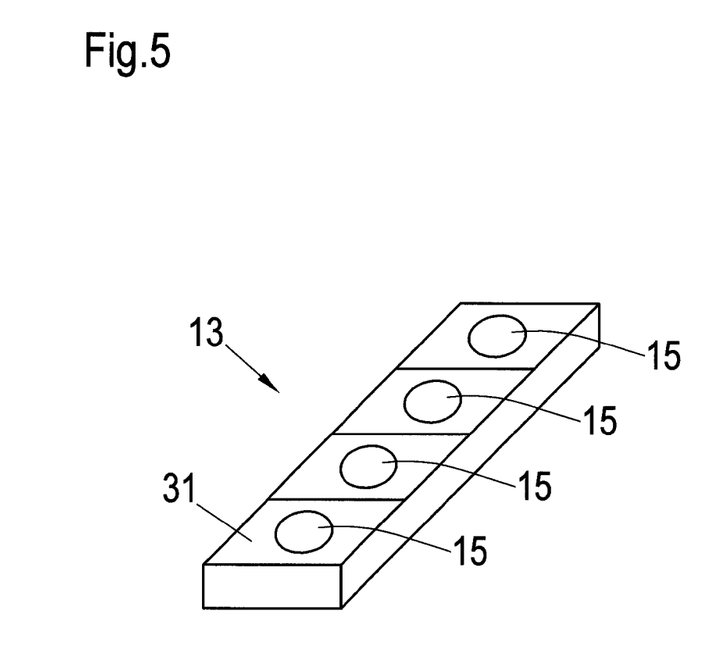
FIG. 5 shows an arrangement of four light transmitters of an optoelectronic sensor in accordance with the invention which are arranged on a contiguous semiconductor chip.
Figure 6:
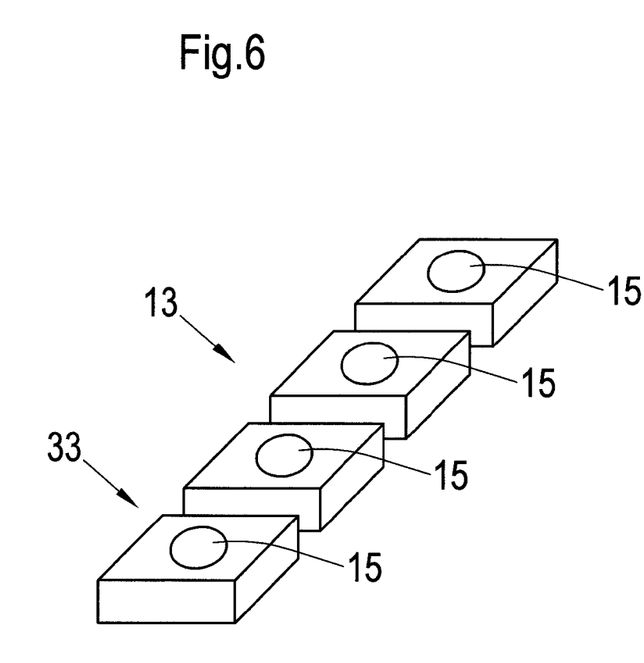
FIG. 6 shows an arrangement of four light transmitters of an optoelectronic sensor in accordance with the invention which are arranged on a divided semiconductor chip.

In general, the light sources 19 can be designed as quasi-point light sources in the form of lasers, VSCEL elements or light emitting diodes (LEDs). The four light transmitters 15 can in particular be formed by respective semiconductor light sources which are arranged on a common semiconductor crystal. FIG. 5 shows such an embodiment in which the four light transmitters 15 are provided as LED elements on an individual contiguous semiconductor chip 31. The achievable high precision with respect to the position of the generated light spots is an advantage in this respect. FIG. 6 in contrast shows an embodiment in which a divided semiconductor chip 33 is provided whose parts each bear a light transmitter 15 in the form of an LED element. This embodiment can be manufactured particularly inexpensively. The light transmitters 15 preferably comprise so-called spotlight LEDs. With such LEDS, there is a circular emission opening and a relatively sharp light spot delineation. In addition, the image of the light spot does not have any bond contact. Differing from the linear arrangement of the four light transmitters 15 shown in the Figures, star-shaped, ring-shaped or matrix-shaped arrangements can also be considered.

The invention overall allows the reliable recognition of object edges 29 independently of their radius of curvature.

REFERENCE NUMERAL LIST 11 optoelectronic sensor
13 light transmission device
15 light transmitter
17 light receiver
19 light source
20, 20' transmission lens
21 transmitted light beam
23 object
24 end face
25 evaluation unit
27 object determination signal
29 object edge
31 contiguous semiconductor chip
33 divided semiconductor chip
F conveying direction R radius of curvature
D1-3 spacing

The invention claimed is:

1. An optoelectronic sensor (11) for recognizing object edges (29) of objects (23),
comprising at least three light transmitters (15) for generating respective collimated or focused transmitted light beams (21), wherein the light transmitters (15) are arranged such that at least two different spacings (D1, D2, D3) result between two respective light transmitters (15) of the at least three light transmitters (15);
comprising at least one light receiver (17) for taking light spots generated by the transmitted light beams (21) on an object (23); and
comprising an evaluation unit (25) which is configured, for the recognition of an object edge (29), to carry out a common evaluation
(i) of an image taken by a light receiver (17) of a light spot generated by the transmitted light beams (21) of a first light transmitter (15) of the at least three light transmitters (15); and
(ii) of an image taken by a light receiver (17) of a light spot generated by the transmitted light beams (21) of another light transmitter (15) of the at least three light transmitters (15),
wherein the pair of light transmitters (15) to be used for the common evaluation is selected in dependence on a selection criterion from at least two differently spaced apart pairs of light transmitters (15);
wherein the selection criterion comprises at least one of an expected radius of curvature of an object edge (29) and a quality signal generated with reference to the reception intensities of the images of the light spots taken by the light receivers (17).

2. The sensor in accordance with claim 1, wherein, for recognizing an object edge (29), the sensor (11) is configured to carry out respective common evaluations simultaneously or consecutively for at least two differently spaced apart pairs of light transmitters (15).

3. The sensor in accordance with claim 2, wherein the sensor (11) is configured to use each of the carried out common evaluations for recognizing an object edge (29).

4. The sensor in accordance with claim 1, wherein at least four light transmitters (15) spaced apart from one another are provided, with the evaluation unit (25) being able to carry out a respective common evaluation for at least two differently spaced apart pairs of light transmitters (15).

5. The sensor in accordance with claim 1, wherein exactly four light transmitters (15) spaced apart from one another are provided, with the evaluation unit (25) being able to carry out a respective common evaluation for at least two differently spaced apart pairs of light transmitters (15).

6. The sensor in accordance with claim 1, wherein the light transmitters (15) are arranged on a line.

7. The sensor in accordance with claim 6, wherein the line extends transversely to an expected object edge (29).

8. The sensor in accordance with claim 6, wherein the light transmitters (15) are arranged on a straight line.

9. The sensor in accordance with claim 6, wherein the light transmitters (15) are arranged at a uniform spacing on the line.

10. The sensor in accordance with claim 1, wherein a separate transmission optics (20) is associated with each of the at least three light transmitters (15).

11. The sensor in accordance with claim 10, wherein the separate transmission optics (20) is a transmission lens.

12. The sensor in accordance with claim 1, wherein a common transmission optics (20') is associated with the at least three light transmitters (15).

13. The sensor in accordance with claim 12, wherein the common transmission optics (20') is a transmission lens.

14. The sensor in accordance with claim 1, wherein the at least three light transmitters (15) are formed by respective semiconductor light sources which are arranged on a common semiconductor crystal (31, 33).

15. The sensor in accordance with claim 1, wherein the sensor (11) is configured to control the at least three light transmitters (15) alternatingly.

16. An optoelectronic sensor (11) for recognizing object edges (29) of objects (23),
comprising at least three light transmitters (15) for generating respective collimated or focused transmitted light beams (21), wherein the light transmitters (15) are arranged such that at least two different spacings (D1, D2, D3) result between two respective light transmitters (15) of the at least three light transmitters (15);
comprising at least one light receiver (17) for taking light spots generated by the transmitted light beams (21) on an object (23); and
comprising an evaluation unit (25) which is configured, for the recognition of an object edge (29), to carry out a common evaluation
(i) of an image taken by a light receiver (17) of a light spot generated by the transmitted light beams (21) of the first light transmitter (15) of the at least three light transmitters (15); and
(ii) of an image taken by a light receiver (17) of a light spot generated by the transmitted light beams (21) of another light transmitter (15) of the at least three light transmitters (15),
wherein the pair of light transmitters (15) to be used for the common evaluation is selected in dependence on a selection criterion from at least two differently spaced apart pairs of light transmitters (15);
wherein, for recognizing an object edge (29), the sensor (11) is configured to carry out respective common evaluations simultaneously or consecutively for at least two differently spaced apart pairs of light transmitters (15);
wherein the sensor (11) is configured to use only one of the carried out common evaluations for recognizing an object edge (29) in dependence on the selection criterion.

17. An optoelectronic sensor (11) for recognizing object edges (29) of objects (23),
comprising at least three light transmitters (15) for generating respective collimated or focused transmitted light beams (21), wherein the light transmitters (15) are arranged such that at least two different spacings (D1, D2, D3) result between two respective light transmitters (15) of the at least three light transmitters (15);
comprising at least one light receiver (17) for taking light spots generated by the transmitted light beams (21) on an object (23); and
comprising an evaluation unit (25) which is configured, for the recognition of an objected edge (29), to carry out a common evaluation
(i) of an image taken by a light receiver (17) of a light spot generated by the transmitted light beams (21) of a first light transmitter (15) of the at least three light transmitters (15); and (ii) of an image taken by a light receiver (17) of a light spot generated by the transmitted light beams (21) of another light transmitter (15) of the at least three light transmitters (15), wherein the pair of light transmitters (15) to be used for the common evaluation is selected in dependence on a selection criterion from at least two differently spaced apart pairs of light transmitters (15);

wherein, for recognizing an object edge (29), the sensor (11) is configured to carry out respective common evaluations simultaneously or consecutively for at least two differently spaced apart pairs of light transmitters (15);

wherein the sensor (11) is configured to use each of the carried out common evaluations for recognizing an object edge (29);

wherein the sensor (11) is configured to carry out the recognition of an object edge (29) with reference to a logical link of the two common evaluations carried out for the two differently spaced apart pairs of light transmitters (15).

18. A method of recognizing object edges (29) of objects (23), wherein at least two light spots are generated on an object (23) simultaneously or consecutively;

the images of the generated light spots are taken by means of at least one light receiver (17); and (i) an image taken by a light receiver (17) of a first light spot of the at least two light spots; and (ii) an image taken by a light receiver (17) of another light spot of the at least two light spots are jointly evaluated, wherein the light spots are generated by a pair of light transmitters (15) of an arrangement of at least three light transmitters (15) which are arranged such that at least two different spacings (D1, D2, D3) result between two respective light transmitters (15) of the at least three light transmitters (15); and wherein the pair of light transmitters (15) is selected in dependence on a selection criterion from at least two differently spaced apart pairs of light transmitters (15);

wherein at least one of an expected radius of curvature of an object edge (29) and a quality signal generated with reference to the reception intensities of the images of the light spots taken by the light receivers (17) is used as a selection criterion.

* * * * *